April 21, 1931.

S. E. TROUT

CARD INDEX

Original Filed July 27, 1922

Re. 18,053

Inventor

Silas Edgar Trout

By Henry E. Rockwell

Attorney

Reissued Apr. 21, 1931

Re. 18,053

UNITED STATES PATENT OFFICE

SILAS EDGAR TROUT, OF PHILADELPHIA, PENNSYLVANIA, ASSIGNOR, BY MESNE ASSIGNMENTS, TO REMINGTON RAND, INC., OF NEW YORK, N. Y., A CORPORATION OF DELAWARE

CARD INDEX

Original No. 1,461,407, dated July 10, 1923, Serial No. 577,882, filed July 27, 1922. Application for reissue filed April 1, 1925. Serial No. 20,004.

This invention comprises a card index. It is contemplated to provide certain improvements in devices of this kind, particularly where a number of overlapping cards are arranged in a frame or carrier in such a way that only a line or small portion of each card is exposed.

In the present invention a holder for the cards or pocket is formed by the simple expedient of arranging a member on the lower portion of a flat card, at either end thereof, the card-pocket itself being suspended by ordinary paper clips on the looped ends of a fine wire, in such a manner that slight bending of the card will permit its removal, and the wire itself being movably or pivotally mounted in bails or eyes upon a backing strip of metal or the like which strip has end portions slidably arranged in and supported by turned-over portions of the carrying frame.

More specific objects and advantages will be brought out more fully in the description which follows.

A drawing illustrating an embodiment of the invention accompanies the specification, the following views being shown:

Figure 1:
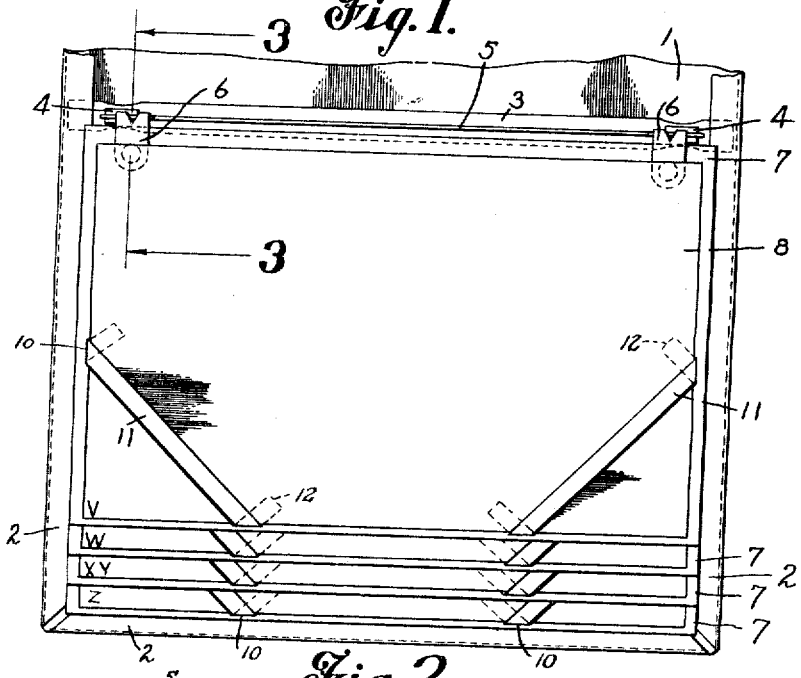
Fig. 1 is a fragmentary view in front elevation of a frame or carrier with several card-carrying devices arranged therein.
Figure 2:
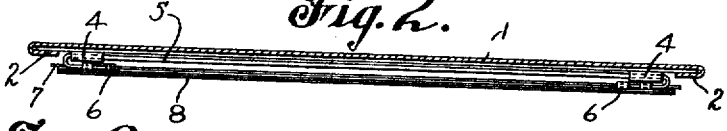
Fig. 2 is a view in top plan, the frame being shown in section.
Figure 3:
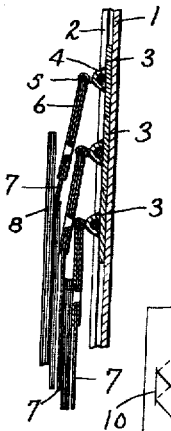
Fig. 3 is a detail view on line 3—3 of Fig. 1.

In these views 1 indicates a frame or carrier, having bent-over edges 2 which form a bearing and support for a flat plate or strip 3 removably insertable under the bent-over portions and between these and the body of the frame.

This strip is preferably resilient so as to be capable of being bowed in the centre in addition to the manner of inserting by sliding the ends under the bent-over portions of the frame. It has at opposite ends, and at a point spaced from the bent edges of the frame, when inserted, bails or eyes 4. These are preferably stamped up from the body of the strip and constitute bearings in which a wire or the like 5 is mounted. The ends of this wire are bent inwardly and in spaced relation to the eyes, forming bearings upon which clips 6 may be pivotally arranged.

These clips are secured to a card 7, at either side thereof, the card 7 being of resilient material so that by slightly bowing it centrally the clips may be removed from or inserted upon the turned-over portions of the wire. The card 7 is also provided with card-carrying means so as to constitute a pocket or support for a card or the like 8.

Figure 4:
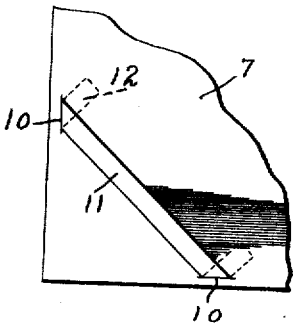
Fig. 4 is a fragmentary view of one of the card-carrying devices of Fig. 1.
Figure 5:
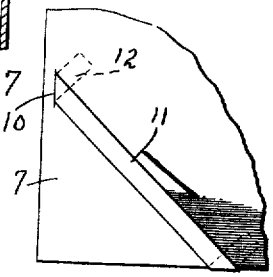
Fig. 5 is a fragmentary view of a card-carrying device of a modified form.

In Figs. 1 and 4 the cards are formed into pockets or carriers by providing slits 10 in the face of the card and at an angle to each other. A strip 11 of preferably transparent material such as oiled silk or the like is extended diagonally across the corners of the card between the slits, end portions 12 of this strip being passed through the slits and secured to the back of the card 7. In Fig. 5, one end of strip 11 is passed through a slit and the other end passed over the edge of the card and secured to the back in any suitable manner, preferably by pasting.

The provision of the bails in the resilient strip with the wire inserted, constitutes a cheap, easily made and very effective manner of mounting card carriers. The use of a wire in the bails and provided with bent-over ends to constitute carriers for the card clips, permits more easy inspection and turning of the card carriers as they are pivotally mounted on the ends of the wires and may be inserted and removed by merely bending the cards. It also assures a better lay of the cards and carriers than are afforded where only a bent portion of wire is depended upon for this purpose.

The arrangement of pockets in the carrying cards also simplifies this construction, reducing weight and adding to simplicity and efficiency.

It will be understood that certain obvious changes in arrangement and construction are considered within the scope of the invention as claimed.

What I claim is:

1. A card index comprising a carrying frame having flanged portions constituting a bearing and support for card-carrying strips; a strip having ends adapted to be disposed under the flanged portions of the frame; bails disposed on said strip and constituting bearings for a card-carrying member; a card-carrying member mounted on said bails, said member having portions extending in spaced relation to the body thereof, a card-carrying clip adapted to pivotally bear on a portion of the card-carrying member, and a card-carrying support adapted to be attached to the clip.

2. In a card support, a substantially rectangular sheet, having slits formed adjacent a corner thereof, a strip of material arranged diagonally across a corner of said sheet on one face thereof, the ends of said strip passing through corresponding slits and being attached to the opposite face of said sheet, said strip forming a pocket for the reception of the corner of a record card.

3. In an index or file, the combination of a series of reference members adapted to be secured upon a carrying frame in overlapped relation, with a margin of each exposed to view, each of said members having means including a holding member extending across a corner portion toward a side and marginal edge of said reference member, said holding member having a portion passing through said reference member and secured thereto.

4. In an index or file, a reference-member holder of the hinged type having means secured to the corners adjacent the free margin of said holder for engaging the corners of a reference member, said means each comprising a member having a portion extending angularly across a corner and other portions passing through the material of said holder.

In witness whereof, I have hereunto set my hand this 19th day of March, 1925.

SILAS EDGAR TROUT.

CERTIFICATE OF CORRECTION.

Reissue Patent No. 18,053. Granted April 21, 1931, to

SILAS EDGAR TROUT.

It is hereby certified that the name of the assignee in the above numbered patent should have been written and printed as Remington Rand Inc., instead of "Remington Rand, Inc.", as shown by the records of assignments in this office; and that the said Letters Patent should be read with this correction therein that the same may conform to the record of the case in the Patent Office.

Signed and sealed this 9th day of June, A. D. 1931.

(Seal)

M. J. Moore,
Acting Commissioner of Patents.